United States Patent

[11] 3,600,060

[72] Inventors Donald Churchill
Kettering;
Janes V. Cartmell, Dayton, both of Ohio
[21] Appl. No. 707,706
[22] Filed Feb. 23, 1968
[45] Patented Aug. 17, 1971
[73] Assignee The National Cash Register Company
Dayton, Ohio

[54] DISPLAY DEVICE CONTAINING MINUTE DROPLETS OF CHOLESTERIC LIQUID CRYSTALS IN A SUBSTANTIALLY CONTINUOUS POLYMERIC MATRIX
17 Claims, 7 Drawing Figs.

[52] U.S. Cl. ............................................. 350/160,
250/43.5, 250/83, 252/316, 313/89
[51] Int. Cl. ....................................... G02f 1/28,
H01j 29/10
[50] Field of Search............................................ 313/108;
315/246; 350/160; 23/230 LC; 252/301.2; 250/71,
83.3, 43.5

[56] References Cited
UNITED STATES PATENTS
| | | | |
|---|---|---|---|
| 3,218,919 | 11/1965 | Sturner et al. | 350/166 X |
| 3,114,836 | 12/1963 | Fergason et al. | 250/83 |
| 3,379,915 | 4/1968 | Sentementes et al. | 313/108 |
| 3,415,991 | 12/1968 | Asars | 250/83 |
| 3,430,088 | 2/1969 | Beswick | 313/108 |
| 3,440,471 | 4/1969 | Baczewski et al. | 313/108 |
| 3,441,513 | 4/1969 | Woodmansee | 252/408 |
| 3,322,485 | 5/1967 | Williams | 350/160 |

FOREIGN PATENTS
1,484,584 5/1967 France ........................ 350/160

OTHER REFERENCES

J. H. Muller— Article on " Effects of Electric Fields on Cholesterol Nonanoate Liquid Crystals" in Vol. 2, of " Molecular Crystals" 1966 by Gordon & Breach. Science Publishers in Great Britain, pages 167— 188 (pages 167 to 169 are sufficient for this case)

*Primary Examiner*—Roy Lake
*Assistant Examiner*—V. Lafranchi
*Attorneys*—E. Frank McKinney and Joseph P. Burke ABSTRACT: This disclosure is directed to articles of manufacture, chiefly display devices, containing minute "naked" droplets or inclusions of cholesteric liquid crystal material in a substantially continuous polymeric matrix, said liquid crystal material changing color or shade of color not only upon application of an electric potential but also upon removal of the field. The image produced has a comparable outline to that of the path of the electric field. Three chromatic states are evident, the normal color (before the electric potential is applied), the color given off when the electric field is applied, and the color observed when the electric field is removed. All three chromatic states are readily discernible from one another. The polymer matrix protects the cholesteric liquid crystal droplets from aging and enhances electric field behavior because the third chromatic state (electric potential removed) has a greater longevity with the matrix-bound material versus unprotected material of identical composition but no polymeric matrix. Other advantages are also discussed.

PATENTED AUG 17 1971
3,600,060
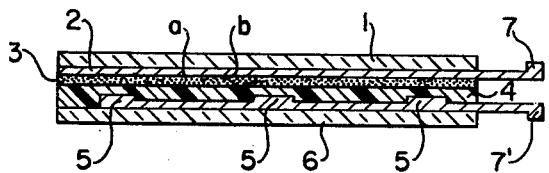
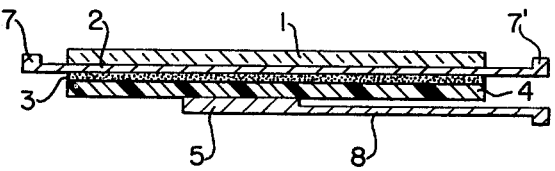
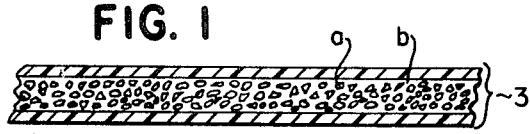
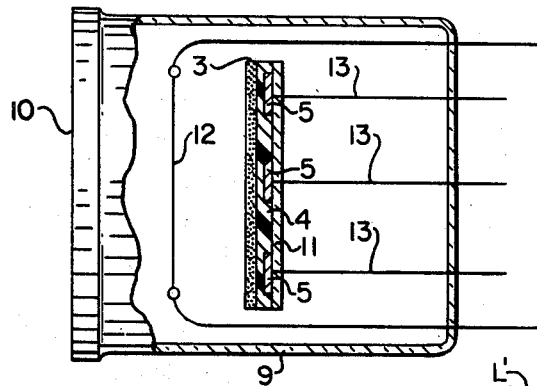
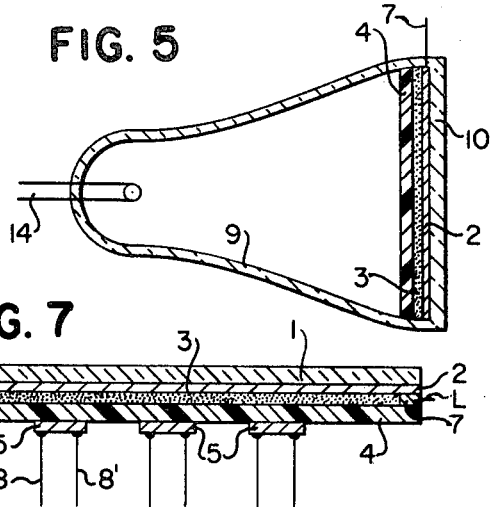
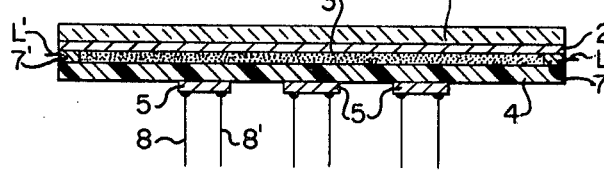
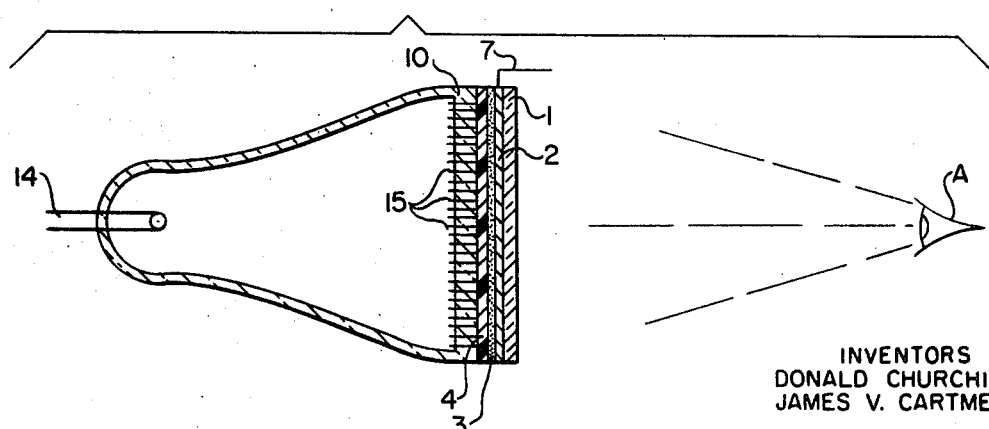
INVENTORS
DONALD CHURCHILL &
JAMES V. CARTMELL
BY E. Frank McKenney
Joseph P. Burke
THEIR ATTORNEYS

DISPLAY DEVICE CONTAINING MINUTE DROPLETS OF CHOLESTERIC LIQUID CRYSTALS IN A SUBSTANTIALLY CONTINUOUS POLYMERIC MATRIX

The present invention is directed to an article of manufacture for utilizing an electric field to obtain an easily discernible, stable, and optionally either comparatively permanent or readily heat-erasable chromatic (color and/or reflectance, viz, reflective intensity) representation of comparable outline to said electric field. Since the chromatic representation is stable, it can serve a storage (memory) function. One of the particularly advantageous features of the present invention is that the chromatic representation can be generated by a one-shot signal output, viz, an electronic computer output signal, a single sweep signal such as a radar scan, a display panel where information may be entered once for an extended period storage such as an air terminal schedule display.

Furthermore, the chromatic representation in the color stable (storage) state is capable of representing a fixed body or state of information which can be retrieved and examined readily without requiring continuous electric field potential, e.g., continuous potential such as that obtained from an electron gun, e.g., cathode ray tube, using conventional electronic computer equipment.

The article of this invention comprises, in its essential components, a pair of spaced electrodes with a matrix-bound, droplet-containing cholesteric liquid crystalline member located in such a position that the electrodes impose an electric potential on said liquid crystal member. Usually the electrodes are positioned such that the first electrode (the electrode closer to the viewing agency, e.g., eyes of the viewer) and second electrode (the electrode more remote from the viewing agency, e.g., viewer's eyes) are in electric field-generating proximity to one another and the intermediate cholesteric liquid crystalline member can, but need not, be in contact with the first and/or second electrode. Both direct current and alternating current can be employed to produce the electric field. The cholesteric liquid crystalline member can be composed of a single substantially continuous polymer matrix-bound, naked droplet or inclusion of cholesteric liquid crystalline material, but usually said member is composed of a plurality (and preferably a profusion) of individual, minute, naked droplets or inclusions of cholesteric liquid crystalline material. The term "liquid crystal," as used herein, is employed in the generic, art-recognized sense to mean the state of matter often referred to as a mesophase, wherein the material exhibits flow properties associated with a liquid state but demonstrates long range ordering characteristics of a crystal. The cholesteric liquid crystal refers to a particular type of mesophase most often demonstrated by esters of cholesterol. Many of the cholesteric liquid crystals exhibit a reflective scattering of light giving them an iridescent appearance. The polymer matrix-bound cholesteric liquid crystalline droplet-containing member can be, and usually is, composed of droplets of a mixture of materials which form a cholesteric liquid crystal. The term "naked" as used herein refers to the fact that the droplets of liquid crystal material have no covering except for the polymeric matrix in which they are located. Insofar as the large majority of droplets are concerned, the polymer matrix is continuous, that is to say that the internally located droplets are totally enveloped by a given portion of the matrix. Many of the droplets located close to the outer surface(s) of the matrix are likewise in a continuous matrix of polymer material. Some of the droplets are on the surface or a portion thereof has direct access to the open air through an opening(s) in the polymer matrix. The term "substantially continuous" accurately describes the polymer matrix which contains the vast majority of liquid crystal droplets. At least one of the materials in the cholesteric liquid crystalline phase must be chromatically responsive to an electric field of the requisite intensity. Moreover, so long as the cholesteric liquid crystalline member is located intermediate (between) the electric field-imposing electrodes, the direction at which the field is applied to said member, viz, perpendicular or essentially parallel to the direction of viewing is immaterial.

While the first and second electrodes need not be (and usually are not) coextensive throughout their entire extent and the cholesteric liquid crystalline member need not be in direct contact with either or both electrodes; it is necessary for both the first and second electrodes to be close enough to one another and to the intermediate cholesteric liquid crystalline member to enable the formation of an electric field between the first and second electrodes. For most purposes, the cholesteric liquid crystalline member contains a cholesteric liquid crystalline material which is chromatically responsive to an electric field of from about 10,000 to about 1,000,000 volts per centimeter of thickness of the cholesteric liquid crystalline droplet-containing member. By "chromatically responsive" is meant that the cholesteric liquid crystalline material (present in droplet form in the substantially continuous polymer matrix defining the cholesteric liquid crystalline member) must exhibit either an apparent change in color and/or reflective intensity (as viewed from incident white light) upon application of an electrical field of the above specified requisite intensity thereto. Hence the term "chromatic response" is intended to include both changes (shift of wave length) in color and changes in intensity of reflectance of the same color so that it appears different in color or shade of color from the previous color slate(s). Thus, as used herein, a change in color is synonymous with a change in reflective intensity and vice versa. The term "apparent" is employed to denote that the color effect induced or brought about by the electric field, or subsequent to its application, is different from the preexisting (natural) color or absence thereof present in the liquid crystals, per se. Usually the electric field employed will have an intensity ranging from about 20,000 to 200,000 volts per centimeter of thickness of the encapsulated cholesteric liquid crystalline member.

In addition to protecting the droplets of cholesteric liquid crystal material, the substantially continuous polymeric matrix enables better adhesion between the cholesteric liquid crystal member and the first and second electrodes or comparable contiguous surfaces. Also, the presence of the polymeric matrix (which can be controlled to be of uniform and accurate thickness) serves to enhance the optical homogeneity of the chromatic representation (image) observed in the display device.

CHOLESTERIC LIQUID CRYSTAL MEMBER

While most, if not all, cholesteric liquid crystal materials exhibit chromatic response to electric potential; different cholesteric liquid crystals, and mixtures thereof, respond in varying chromatic contrasts at different electric potential intensity levels. Of course, all changes in shades of color are not equally discernible to the naked eye. For this reason and others, e.g., "blindness" to certain colors and shades of colors; it is within the purview of this invention to use specific color filters and optical sensors to aid in detection of subtle changes in shades of color and convert these subtle changes to more clearly recognizable ones. Hence, while all cholesteric liquid crystals are not equal in chromatic response to electric potential for display purposes when the display is viewed by the naked eye; deficiencies in clearly observable contrast can be compensated for. Nevertheless, for most visual display devices it is preferable to employ cholesteric liquid crystals whose chromatic response is both clearly discernible to the naked eye and in sharp chromatic contrast to its preceding color state.

When an electric field is imposed on the matrix entrapped droplets of cholesteric liquid crystal material, the liquid crystals change color (or reflective intensity) substantially instantaneously (20 to 80 milliseconds) to shift from a first chromatic state (that "normal" color state existing prior to the application of an electric field thereto) to a second chromatic state, viz., the chromatic state existing due to the presence of the electric potential. The second chromatic state demonstrates a color (or reflective intensity) different from that of the first chromatic state, and this difference is preferably readily recognizable to the naked eye. Upon removal of the electric field, the color changes from the second chromatic state to a third chromatic state and the color (or reflective intensity) exhibited by the liquid crystal material in the third chromatic state is different from that of the color given off in the second chromatic state and first chromatic state, respectively.

A very unusual and advantageous feature of a preferred embodiment of the present invention resides in the fact that the third chromatic state displays a stability and permanence colorwise, viz., it does not readily "fade" back to the first chromatic state. Compared with unprotected cholesteric liquid crystals, the matrix entrapped cholesteric liquid crystal droplets have the ability to retain the third chromatic state in most cases for at least several orders of magnitude of time longer than the unprotected material. This retention ability can be employed in storing information for future use.

An example of the difference between the color or reflective intensity between the three chromatic states spoken of hereinabove can be gleaned from the following illustrative example. Using the mixture of cholesteric liquid crystalline materials noted below in Example 1, an original or first chromatic state which is a green color is observed to the naked eye. Then, when the electric potential is applied so as to create an electric field between the first and second electrodes, the second chromatic state produced is a blue-green color quite distinct in appearance to the naked eye from the first chromatic state. Then, when the electric field potential is removed, a third chromatic state is produced which is, to the naked eye, a grey color, which is quite distinct in appearance from both the green of the first chromatic state and the blue-green of the second chromatic state.

Suitable chromatically responsive cholesteric liquid crystal materials include, but are not limited to, the following: cholesteryl halides, e.g., cholesteryl chloride, cholesteryl bromide and cholesteryl iodide; cholesteryl nitrate and other mixed esters of cholesterol and inorganic acids; cholesteryl esters of saturated and unsaturated, substituted and unsubstituted organic acids, esp. cholesteryl esters of $C_1$ to $C_{22}$ aliphatic, monocarboxylic acids, e.g., cholesteryl nonanoate, cholesteryl crotonate, cholesteryl chloroformate, cholesteryl chlorodecanoate, cholesteryl chloroeicosanoate, cholesteryl butyrate, cholesteryl caprate, cholesteryl oleate, cholesteryl linolate, cholesteryl linolenate, cholesteryl laurate, cholesteryl erucate, cholesteryl myristate, cholesteryl clupanodonate, oleyl cholesteryl carbonate, cholesteryl heptyl carbamate, decyl cholesteryl carbonate; cholesteryl esters of unsubstituted or halogenated aryl, -alkenaryl, -aralkenyl, -alkaryl and -aralkyl organic acids, especially cholesteryl esters of those organic acids containing an aromatic moiety and from 7 to 19 carbon atoms, such as, cholesteryl p-chlorobenzoate, cholesteryl cinnamate; cholesteryl ethers, e.g., cholesteryl decyl ether, cholesteryl lauryl ether, cholesteryl oleyl ether, etc.

As mentioned above comparatively pure, chromatically electric potential responsive cholesteric liquid crystalline materials, viz, individual chromatically responsive compounds, can be used; or the chromatically electric potential responsive materials can be used in admixture. The use of such mixtures is actually preferable in many cases because with mixtures the liquid crystalline state can be maintained more readily at ambient room temperatures without requiring extraneous heating. On the other hand when an individual chromatically responsive compound is employed, it i frequently necessary to heat the immediate environment (where the device is to be employed) in order to maintain the material in the liquid crystal state because many such materials are solids at ambient room temperatures. For most applications the chloro derivatives are preferred due to their ability to produce color changes (or shifts in reflective intensity) readily recognizable to the naked eye especially in the second and third chromatic states mentioned hereinabove. Some exemplary mixtures of cholesteric liquid crystal materials which can be employed in accordance with this invention include, but are not limited to, the following: cholesteryl nonanoate, cholesteryl chloride and cholesteryl cinnamate; cholesteryl nonanoate and cholesteryl chloride; cholesteryl nonanoate and cholesteryl bromide; cholesteryl nonanoate, cholesteryl bromide and cholesteryl cinnamate; cholesteryl nonanoate, cholesteryl iodide and cholesteryl cinnamate; cholesteryl nonanoate, cholesteryl iodide and cholesteryl benzoate; cholesteryl nonanoate, cholesteryl chloride and oleyl cholesteryl carbonate; cholesteryl nonanoate, cholesteryl chloride, oleyl cholesteryl carbonate and cholesteryl bromide; oleyl cholesteryl carbonate and cholesteryl iodide, oleyl cholesteryl carbonate and cholesteryl p-chloro benzoate; etc.

Also, it should be understood that included within the term cholesteric liquid crystalline mixtures are mixtures of two or more individual materials, one or more of which individually does not form a cholesteric liquid crystal phase but which in admixture exhibit a cholesteric liquid crystal phase. Hence, two or three materials which individually are not cholesteric liquid crystals can be employed in accordance with this invention if, when in admixture, they do exhibit cholesteric liquid crystal behavior, viz, they form a mesophase which demonstrates the property of reflection light scattering. One such mixture is cholesteryl nonanoate, oleyl cholesteryl carbonate and cholesterol. The latter material, by itself, does not form a cholesteric liquid crystalline phase; but does so in combination with the other cholesteric materials.

Various natural and synthetic film-forming polymeric materials can be employed to constitute the polymeric matrix, film or coating in which the individual droplets or inclusions of cholesteric liquid crystal material are located. Any transparent or substantially transparent film-forming polymeric material with adequate electrical insulation properties and which is soluble in a liquid which does not dissolve or substantially chemically affect the liquid crystal material adversely can be used. Suitable representative film-forming polymeric materials for this purpose include, but are not limited to, the following: polyvinyl alcohol; gelatin, gum arabic, zein, a prolamine film former derived from the alcohol extraction of zea mays, a grain commonly called Indian corn; hydroxy ethyl cellulose; polyvinyl pyrrolidone; polyethylene oxide; copolymers of ethylene and maleic anhydride; copolymers of vinyl methyl ether and maleic anhydride; etc. The cholesteric liquid crystals can be dispersed or positioned within the polymer matrix conveniently by emulsifying minute droplets of liquid crystal material in a dryable liquid solution of the film-forming polymeric material which is to constitute the polymer matrix. According to a preferred embodiment of this invention, the droplets of liquid crystal material are emulsified in an aqueous solution of film-forming polymer. Since an extremely small droplet size of cholesteric liquid crystal material can be maintained in an emulsion, coatings or films prepared therefrom allow a good optical resolution and have a smooth surface(s). These characteristics enhance the optical or visual readout of display devices containing the droplets in the matrix. In general, individual droplet size can range from about 0.5 to about 50 microns, but usually the individual droplet size ranges from about 1 to about 30 microns. Average droplet size can range from about 1 to 30 microns but usually ranges from about 5 to about 20 microns. Films prepared by drying these emulsions, containing the minute individual liquid crystal droplets or inclusions, can be stained or tinted as desired to enable the polymer matrix to serve as a color filter for light traveling to and from the liquid crystal material. Such a system can be used where a narrowing of the broad iridescent effect present in some liquid crystal materials in the second and third chromatic states is desired. Moreover, such films can also be pigmented slightly, but care should be exercised to avoid use of an excessive amount of pigment or other nonlight reflecting material as it can diminish the color response and brilliance due to interference with incident and reflected light.

Comparative tests between polymer matrix-protected cholesteric liquid crystal materials versus films of unprotected liquid crystal materials of identical composition reveal several important advantages for the films comprised of droplets of cholesteric liquid crystal material in a substantially continuous polymer matrix when employed in the articles of this invention. One of the major advantages resides in the apparent prevention of crystallization of the liquid crystals and mixtures thereof, or at least a diminution in the tendency towards crystallization. Hence, many cholesteric liquid crystal materials and mixtures are normally solid at room temperature. These mixtures often supercool considerably so that crystallization is not immediate at ambient room temperatures. However, they do crystallize within a day or a longer time period and must be reheated to the liquid crystal transition temperature range in order to be suitable for display, for example in chromatic image recognition use. The dispersion of these mixtures in the polymer matrix seems to inhibit crystallization, and the cholesteric liquid crystal materials when dispersed within said polymer matrix are observed to remain in the liquid crystal state for a longer period of time than "pure" film of the same materials (no polymer matrix).

Another advantage attainable in the articles of the present invention is the ability of the matrix-entrapped material to retain the third chromatic state for comparatively permanent periods of time versus the comparatively transitory retention of the third chromatic state in the case of unrestrained cholesteric liquid crystals.

A further and equally important practical advantage of use of the matrix-retained droplets of cholesteric liquid crystals is their ability to be used in multicomponent (multicolor) systems, viz, as coatings or incorporated in a matrix containing a plurality of different cholesteric liquid crystalline mixtures, each mixture giving a characteristic color throughout the three chromatic stages referred to hereinabove with the different mixtures being employed in close proximity so that a multicolored display is achieved in one, two or all three chromatic states. Moreover, polychromatic displays can be achieved by using a plurality of "switched" leads or contacts. In one case, some switches can be turned on and the others left off which creates a polycolored effect using differently colored mixtures or one mixture. Another way to achieve such an effect is to use a plurality of mixtures each of which is responsive at a different level of intensity of field potential to exhibit a different apparent color or shade of color. Yet another way of achieving the polychromatic displays is to have some switches turned on and then turn a portion of them off so that some switches are on, and some switches are off (never having been turned on) some of which were previously on. This works well with a single cholesteric liquid crystal material, one mixture or a plurality of differently colored mixtures.

A still further advantage of the articles of the present invention include their processing flexibility in that a wider range of devices can be prepared to meet a wider range of specifications. For example, electric field sensitive display devices utilizing polymer matrix-retained cholesteric liquid crystal droplets can be prepared to be either flat or curved, and either rigid or flexible. In the case of "pure" cholesteric liquid crystal films, for all practical purposes they require two flat, rigid, evenly spaced electrodes. Of course, these use-limiting requirements are not applicable to the matrix-retained products because the substantially continuous polymer matrix furnishes the uniform support to the extent required, yet can be flexible enough to accommodate complex shapes. Yet another advantage attendant to the articles of this invention is that the polymer matrix not only protects the cholesteric liquid crystalline material, e.g., from deleterious orientation and other adverse surface effects, but due to the extremely small droplet size which can be maintained in an emulsion also substantially supplies a uniform thickness to the film thereof since the coating provides the droplets in a condition of roughly uniform diameter. This results in smooth coatings of good optical resolution.

Until recently the utility of cholesteric liquid crystals was limited due to disadvantages, including the following ones:

1. Some systems containing a mixture of one or more intermingled cholesteric liquid crystal compounds, as a film, are subject to crystallization of large areas at the desired working temperatures. This undesirable crystallization tends to concentrate one of the active materials at each crystallization site to thereby separate it from the other components of such a mixture. In turn, component separation results in loss of precision and efficiency of color change;

2. Most cholesteric liquid crystal materials which are chromatically responsive to an electric field are cholesterol derivatives which are oily liquids at and above their melting temperatures. When they exist as a film on any surface, the film (being wet) is subject to injury and contamination, e.g., form aging and contact with the environment. Thus, dust particles are easily entrapped by the liquid surface and can serve as undesirable nucleation sites for crystallization. Also such films are exposed to contact with any material in the vicinity with resultant disorganization and possible change of thickness in localized areas thereby altering chromatic response;

3. The flow of such liquid crystal films between electrodes;

4. The formation of bubbles due to electrical breakdown of the cholesteric liquid crystal material;

5. Nonuniform optical and electrical surface effects exhibited at the electrodes, e.g., orientation at the surface of the cholesteric liquid crystal film. The present invention overcomes or alleviates most, if not all, of these problems.

The total (overall) thickness of the cholesteric liquid crystalline member can range from about 0.001 to about 0.05 centimeters (not counting the thickness of any optional protective film applied thereto). Usually the film thickness of the cholesteric liquid crystalline member ranges from about 0.003 to about 0.01 centimeters and preferably from about 0.005 to about 0.01 centimeters. The film can be of a thickness to include only a single layer or a few layers of liquid crystal droplets; or the film can include a larger number of layers thereof, within its thickness.

FIRST ELECTRODE

While both electrodes can be composed of nontransparent material or presented in nontransparent form (not FIG. 4); it is usually preferable that the first electrode be transparent. In such cases the first electrode can be formed of any transparent electroconductive material. For practical considerations, it is usually desirable to form the transparent first electrode as thin as possible, in order to obtain a combination of maximum transparency and yet retain electrical continuity of the electrode. According to a preferred embodiment of this invention, the transparent first electrode can be composed of transparent metal or metal oxide films, coatings or other electroconductive layers. Suitable metal and metal oxide materials which can be employed for this purpose include, but are not limited to, the following: tin oxide, gold, platinum, chromium, nickel. In the case of metallic materials, transparent film can be made by using very thin homogeneous coatings or preparing a series of very thin, closely spaced ribbons of the metal by photoetching away 80—90 percent or more of the material. A more comprehensive listing of suitable transparent metal and metal oxide electric conductive films can be found in U.S. Pat. No. 2,628,027 to Colbert et al., the disclosure of which is incorporated herein by reference. The deposition of the transparent electrode can be upon a protective inorganic, e.g., glass, or organic, e.g., acrylate or alkyl acrylate polymer plastic or other polymeric protective base material, which then constitutes the upper or viewing surface through which the cholesteric liquid crystalline member's chromatic response to the electric potential is viewed. Various transparent plastic and resinous protective layers can be first provided with a transparent electroconductive layer by known coating or deposition techniques, such as, e.g., those indicated in any one of the following U.S. Pat. Nos.: 2,704,265; 2,739,083; 2,740,732; 2,750,832; 2,758,948; 2,904,450; 2,907,672; 3,001,901 and 3,020,376. During assembly the transparent first electrode is placed in direct contact with the cholesteric liquid crystalline member. Other suitable exemplary procedures for depositing electroconductive coatings upon the glass or plastic base include thermal sputtering or evaporative coating using metal halide solutions from a vacuum to which oxygen is then supplied in order to oxide the metal halide salt and form the metal oxide film in situ upon the desired base material. Other satisfactory conventional techniques are used when forming metal coatings, e.g., by chemical reduction, viz, coating metal salt solution containing a reducing agent to reduce the metal salt to yield the metal film (one step procedure) or coating a metal salt onto the base, followed by a second coating using a solution containing a reducing agent (two step procedure), the latter procedure being similar to that used to form silver mirror films. Other satisfactory coating procedures will be apparent to those skilled in the art. When the first electrode is nontransparent, e.g., in the form of a thin, electron-emitting, resistive wire(s) as in FIG. 4; the wire(s) can be positioned so as not to obstruct or interfere substantially with the observed image.

SECOND ELECTRODE

The second electrode can be composed of any electroconductive material and need not be transparent; nor need it be coextensive with the first electrode throughout its entire extent. In fact, usually the second electrode is neither transparent nor coextensive with the first electrode. For example, the second electrode can be imposed in the pattern of a printed circuit or it can have any desired configuration. Hence, the second electrode can be deposited in transparent, nontransparent or partially transparent form, using such materials as copper, silver, gold, iron-containing metal alloys, carbon black, graphite, lead sulfide, etc.

In order to aid in viewing the chromatic representation produced upon the cholesteric liquid crystalline member through the imposition of the electric potential thereto, it has been found desirable to provide an opaque, e.g., black contrasting background behind the cholesteric liquid crystalline member, e.g., either in front of or behind the second electrode. The reason for this is that the chromatic change which the liquid crystals undergo is observable through light scattering, viz, the scattering of light through the strata of the liquid crystalline material. Hence, in order to observe the chromatic changes properly, it is most advisable to provide a black, light-absorbing background. That background can, itself, be an electrode, e.g., be prepared from black paints, black dye, etc., containing an electroconductive component such as carbon black or black anodized metal. The black background is not always necessary however. Note the description in conjunction with FIG. 6 in this respect.

In many cases (e.g., FIGS. 2, 3, 5 and 6), it is preferable to employ an insulating glass, plastic or other transparent or substantially transparent material as a protective layer on top of the transparent first electrode. Suitable materials from which this protective layer can be made include, but are not limited to, the following: Various types of glass and inorganic ceramics, such as conventional soda-lime-silica glass; lithia-soda-lime-silica glass; potassia-soda-lithia-alumina-silica glass, various "organic glass" and other transparent organic polymeric materials, such as the methacrylate and alkylmethacrylate and alkylacrylate plastics, e.g., polymethylmethacrylates, polyethylmethacrylates, polymethylacrylates, polyethyl acrylates, and other acrylic acid and methacrylic acid homo and copolymers. Other transparent or substantially transparent insulating protective materials suitable for use will be apparent to those skilled in the art.

In order to supply an electric potential to the first electrode and second electrode, it is practical and convenient to locate conductive elements (leads) in electroconductive contact with both of said electrodes. Thus, one or more conductors will be located in direct contact with the first electrode and one or more other conductors will be in contact with and preferably located behind the second electrode. A protective layer of glass, plastic, or other electrically insulating material (not necessarily transparent) can be employed as a surfacing layer to protect that side of the article in close proximity to said second electrode and the conductive element(s) or leads in contact therewith.

ILLUSTRATIVE DEVICES

The present invention will be understood in greater detail in conjunction with the attached drawings. FIG. 1 of the drawings is a cross-sectional view through a liquid crystal member or component. FIG. 2 is a cross-sectional view through one embodiment of the present invention which illustrates a display device. FIG. 3 is likewise a cross-sectional view of an article of this invention illustrating an alternative display device. FIG. 4 is a cross-sectional view of a vacuum tube display device wherein the field is supplied by electrons drawn to the surface of the liquid crystalline member. FIG. 5 is a cross-sectional view through a cathode-ray tube containing the structure of the present invention and serving as a display device. FIG. 6 is a cross-sectional view of an alternative form of cathode-ray tube utilizing the present invention. FIG. 7 is a cross-sectional view of yet another device illustrative of this invention wherein both an electric field and thermal energy can be utilized to impose transient and/or comparatively permanent colored images on the same cholesteric liquid crystal member. Optionally selected images can be stored and others erased. Transient images (imposed by heat) can be changed at will on a stored image background of contrasting color.

FIG. 1 shows the presence of cholesteric liquid crystal member 3 comprised of a plurality of minute, individual, "naked" droplets or inclusions, a, of cholesteric liquid crystal material confined within a substantially continuous matrix, b, of polymeric material. The droplets have a random shape and are reasonably uniformly distributed (dispersed) within the polymer matrix. An optional thin, protective barrier film, e.g., polyethylene glycol terephthalate "Mylar" polyester can be deposited on one or both major surfaces of liquid crystal member 3 to prevent deleterious solvation of surface located liquid crystal material, e.g., by a solvent component(s) such as may be contained in opaque lacquer film 4 of FIG. 2. As shown in FIG. 2, transparent (glass or plastic) insulating protective layer 1 is directly in contact with transparent first electrode 2 which in turn is in intimate contact with the cholesteric liquid crystalline member 3. The cholesteric liquid crystalline member 3 is composed of an array or profusion of minute droplets, a, of cholesteric liquid crystalline material retained within a substantially continuous polymeric matrix, b, with or without a protective barrier film (not shown) on one or both sides thereof. In addition to enhancing the optical properties of the liquid crystalline member and protecting the droplets from deleterious exposure, the polymeric film, b, serves as an effective insulator between both of said electrodes. Next to the cholesteric liquid crystalline member 3 is located a black lacquer insulating film 4 to enhance the observation of the chromatic changes in the liquid crystalline member. Conductive elements 5 are located intermediate between lower protective layer 6 (usually glass or plastic) and black insulating film 4. While FIG. 2 shows three such elements, it should be clearly understood that any desired number can be used and the configuration thereof can be arranged in any desired display pattern, sequence or shape. Upper and lower electrodes (leads) 7 and 7', respectively allow the passage of an electric current from a suitable potential source (not shown) into electroconductive contact with both the first transparent electrode and the conductive elements 5. Upon subjecting the liquid crystalline member to the electric field by applying an electric potential across the leads 7 and 7'; the chromatic representation viewed through the transparent layers of 1 and 2 will conform closely with the configuration defined by the field established between conductive elements 5 and the top electrode. That is to say that the configuration established by the elements 5 will be reproduced, but in different color or intensity of reflectance from the surrounding film areas when looking down through the transparent protective layer 1 and transparent first electrode 2. Upon opening the circuit, a further chromatic change takes place in the configuration areas wherein the cholesteric liquid crystalline material rapidly changes from the second chromatic state to the third chromatic state characterized by the ability of the cholesteric liquid crystalline member to retain a substantially permanent and different chromatic state for extended periods of time under normal atmospheric conditions of temperature and humidity. If desired, a sealer tape or potting compound (not shown) can be applied to the outer peripheral edge(s) to aid in sealing the various layers against lateral and interfacial exposure to the atmosphere at the peripheral edge surfaces.

FIG. 3 illustrates an alternative display device and is comprised of transparent glass plate 1 in contact with transparent electroconductive film 2 which in turn is in contact with liquid crystalline member 3, which is composed of a profusion of minute cholesteric liquid crystal droplets or inclusions present in a retaining matrix of insulating polymeric film. Black insulating film 4 is deposited by coating on the cholesteric liquid crystalline member 3 throughout its entire extent. Electroconductive film 5 (as deposited in any desired configuration to constitute for example a printed circuit or portion thereof) is deposited in intimate contact with black insulating layer 4. A conductor lead wire 8 is attached to or made integral with conductor film 5. Leads, 7 and 7', are attached to bus bars in contact with the transparent tin oxide electroconductive film 2 at the left- and right-hand sides, respectively, thereof. Upon application of potential across the upper transparent electrode 2 and the lower electroconductive film 5 through the intermediate cholesteric liquid crystalline member 3, the visual chromatic image corresponding to the configuration of printed circuit electroconductive film 5 appears to the viewer through the protective layer 1 and transparent electroconductive film 2, thereby exhibiting a colored image, the first, second (potential on) and third (potential off) chromatic states of which will depend upon the composition of the selected cholesteric liquid crystal material or mixtures thereof. On passing a current through leads 7 and 7' through the upper tin oxide electrode, the upper electrode can be heated to the isotropic transition temperature of the cholesteric liquid crystals thereby erasing the image produced during the third chromatic state. Upon cooling to ambient room temperatures, the liquid crystals then return to their original (first) chromatic state. Hence, it will be seen that this invention allows storage of information until desired followed erasure followed by imposition of new, e.g., updated information all accomplished electronically on a one-shot basis without the necessity for continuous electronic output during either storage or erasure.

FIG. 4 illustrates an article of the present invention wherein the field is established by electrons attracted to the surface of the cholesteric liquid crystal-containing film. A matrix of conductive elements, 5, is supported on insulator, e.g., fiberglass substrate in a vacuum tube 9 with a transparent viewing port or face plate 10. The conductive elements are held at a positive potential by means of connecting the leads 13 to a potential source (not shown). A current is passed through thin, nontransparent resistive wire 12, so that it is heated and emits electrons. The electrons are drawn to the surface of the liquid crystal film 3, directly over the positively charged conductive elements. The field formed between the surface electrons and the conductive elements causes the liquid crystal to change color. As shown here, three lead elements are used but it is possible to use any desired number and configuration of elements to describe the pattern desired. After the potential is removed from the elements, 5, the pattern will remain until erased by heating to the isotropic transition temperature. This can be accomplished by means of any suitable energy source, e.g., heat lamp, heat wires or passing a current through the conductive elements.

The device of FIG. 5 is a conventional cathode-ray tube envelope 9 (C.R.T.) with a transparent conductor 2 coated on the inner surface of the transparent face plate 10. A film 3 of a profusion of minute droplets of cholesteric liquid crystal confined in a polymeric matrix is coated in direct contact with the transparent electrode 2 on the inner surface of the face plate, and a black insulator film 4 is coated on the liquid crystal film. The transparent electrode 2 is held at a positive potential via lead 7, and electrons from the electron gun 14 are caused by suitable deflection techniques to impinge on the black insulator in the desired pattern. The local fields set up between the electrons at the insulator and the front electrode cause the liquid crystal to change color in those areas forming a visual pattern when viewed from the front of the tube. The pattern is semipermanent and one sweep of the electron beam will suffice to establish a permanent image. This image can be erased by heating the liquid crystal above its isotropic transition temperature. A suitable way to do this is to pass a current through the transparent electrode as described in the previous illustration.

In the device of FIG. 6 a conventional C.R.T. is prepared with a multitude of conductive wires 15 extending through the face plate 10 and flush with the outer surface on the face plate, A black insulating film 4 is formed on the face plate and the liquid crystal film member 3 is coated on the insulator. A transparent protective outer plate 1 upon which a transparent conductive electrode 2 has been deposited is brought in contact with a liquid crystal film with the conductive surface in closest proximity to the liquid crystal member. The transparent electrode 2 is held at a positive potential via lead 7. The electrons from the electron gun 14 are deflected by any suitable conventional technique such that they describe a pattern on the inner surface of the C.R.T. face plate. The electrons striking the wires 15 are drawn to the insulator film 4 and local fields are established across the liquid crystal film 3 between the charged wires 15 and the outer transparent electrode 2. The liquid crystal in these areas will demonstrate a color change visible to the viewing agency, A.

As previously stated, the black insulating layer is often used to absorb light transmitted through the liquid crystal film and thereby increase the contrast of the liquid crystal colors. This light absorbing layer is not always necessary for adequate contrast in this type of a C.R.T. display device however.

In the device of fig. 7, transparent electroconductive coating 2, e.g., tin oxide, is deposited on transparent protective element 1, which also serves as a substrate or support for the coating. Bus bars 7, 7' are attached along the edges of coating 2 and have conductive leads L, L', respectively, attached thereto. Opaque, e.g., black, nonreflective insulator film 4 has a layer or film 3 containing a profusion of minute droplets of cholesteric liquid crystal material confined within a polymeric matrix deposited thereon. Resistive conductor elements 5 can be deposited directly on insulator 4, or on a lower supportive and protective layer (not shown), such as layer 6 of FIG. 1. The cholesteric liquid crystal member 3 is positioned in contiguous or closely spaced relationship to coating 2. Each resistive element 5 has a pair of leads 8, 8' attached thereto, thus enabling each resistive element 5 to be operable separately or in groups, e.g., by appropriate conventional switching. Resistive elements 5 can be formed, or deposited, in any desired configuration or design. The device of FIG. 6 has two primary modes of operation (A) and (B), as follows: (A) Field effect mode of operation with image storage and erasure;

An electric field is applied across the liquid crystal film by a potential applied to the top conductive coating 2 and any one or more of the resistive elements 5. The liquid crystal transforms to the second chromatic state in the area of electric field imposition. After the field is removed; it assumes the third chromatic state in the areas over the resistive elements 5. These areas can be selectively "erased" by passing a current through the rear resistive elements, thereby heating the liquid crystal to the isotropic melt temperature. On cooling, those areas which had been heated return to the first chromatic state and a semipermanent (stored) pattern is displayed from the areas over the elements which were not thermally erased.

When it is desired to change the stored image; the remaining resistive elements can be heated or the entire display unit can be heated by passing a current through the top conductive coating 2 to effect erasure. This mode of operation is more complex for dynamic display but has the advantage that the field can be applied to all the resistive elements at one time and individual switches to these elements are not required.
(B) Thermal mode of operation with storage option;

The device is operated thermally in the following manner:

An electric current is passed through the resistive element 5 by means of separate pairs of leads 8, 8' for each such restive element. The heating of each element raises the temperature of the encapsulated liquid crystal directly above the element to the isotropic melting point. The heated portion becomes nonreflecting in contrast to the colored appearance of the unheated areas. When the current is interrupted, the element cools to ambient temperature and the liquid crystal returns to its initial colored (first chromatic) state. Thus different characters and designs (corresponding in shape and size to that of resistive elements 5) can be displayed in a transient manner.

When it is desired to store an image; one of the leads 8, 8' is connected to a high voltage source (not shown), and the other side of this source is connected to the transparent top electrode 2, through either of leads L, L' and their associated bus bars 7, 7'. A field generated across the liquid crystal film will cause a color change over the chosen resistive element 5; and when the field is removed, the electric field induced colored image will remain in the third chromatic state.

Erasure of this image can be accomplished readily by heating the liquid crystal member to the isotropic melting temperature either by heating only those elements 5, which were used to generate the field or by passing a current through the top conductive coating 2, by applying a potential across leads L, L'. On cooling, the liquid crystal film return to its original (first) colored state. Other operational modes will be apparent to those skilled in the art.

Hence it will be apparent that the device of FIG. 7 is, in effect, a display device having polychromatic capability for chromatically representing an optionally comparatively permanent (third chromatic state) yet thermally erasable configuration established by an electric field in optional conjunction with an independently operable yet thermally erasable transient, thermally operable, separate display means wherein said device comprises a transparent support 1; a transparent, electroconductive coating 2 on said support; conductive electrodes 7, 7' in contact with said coating and operatively connected by leads L, L' to an electric field source; an insulator film 4 having a cholesteric liquid crystal member 3 in intimate proximity to said film and said coating; at least one electrically conductive resistive element 5 in thermally responsive association with said member, each said resistive element having a separate pair 8, 8' of conductive leads connected to a current source operable independently from said electric field source and wherein said cholesteric liquid crystal member is chromatically responsive to both an electric field and thermal energy applied thereto.

FORMATION OF CHOLESTERIC LIQUID CRYSTAL MEMBER

As noted above the cholesteric liquid crystal members employed in accordance with this invention are comprised of a profusion of randomly shaped inclusions of cholesteric liquid crystal material dispersed in a substantially continuous solid polymeric matrix. These members can be prepared readily by dispersing (emulsifying) minute droplets of cholesteric liquid crystal material in a dryable liquid solution of film-forming polymeric material and then coating, casting or otherwise depositing the solution upon the desired surface. Also films, sheets, layers, etc., can be preformed, e.g., by casting, and then assembled into the composite structure at the desired time. Coating and casting solutions can be prepared readily by adding the cholesteric liquid crystal compound or mixture to a solution, e.g., aqueous solution of film-forming polymer matrix material, e.g., polyvinyl alcohol, using a stirrer, mixer, blender or equivalent agitation device until a liquid crystal droplet size range of from about 5 to about 20 microns is obtained. This emulsion can be coated on the substrate directly, e.g., by means of a draw-down applicator, onto a blackened substrate, e.g., of "Mylar" (polyethylene glycol terephthalate) to a wet film thickness of about 10 mils (0.0254 cm.) and air dried, e.g., at about 25° centigrade. Film thickness can be increased by repeated sequences of coating and drying. The dried emulsion film can be stripped from its substrate and utilized as a preformed film which can be optionally opacified or blackened for use in the articles of this invention. Various mixtures of cholesteric liquid crystals can be used with various polymeric film-forming matrix materials. In accordance with this invention films can be formed which contain from about 30 to about 95 weight percent of cholesteric liquid crystal material, in droplet form, with the remainder being polymer matrix material. Usually, however, the liquid crystal droplets represent from about 50 to about 90 weight percent of the total film weight (droplets plus polymer matrix).

Layers cast from an emulsion of the liquid crystal material and then dried are dry to the touch (although containing liquid inclusions; are relatively unaffected by brushing contact with foreign bodies; are substantially immune to solute contamination, e.g., absorption of extraneous vapor; and are not subject to rapid deterioration by selective nucleation crystallization; and, in cases where crystallization does begin, it is stopped from further areawise development by a boundary of the polymer matrix.

Additional information on preparation of cholesteric liquid crystal members can be found in U.S. Pat. application Ser. No. 861,197 filed Sept. 25, 1969 which is a streamlined continuation of U.S. Pat. application Ser. No. 618,895, filed on Feb. 27, 1967 by Donald Churchill et al. now abandoned. The disclosure of this application is incorporated herein by reference.

Another feature of the incorporation of polymer matrix bound droplets of the cholesteric liquid crystalline materials into a system to provide an electric potential-activated sensing or display device is the utilization of various mixtures of liquid crystals as to droplet size and chromatic response for indicating and/or displaying a wide range of specific levels of electric potential. Such a system, in one case, can comprise a plurality of layers, each layer comprising one, two or more types of droplets having different mixtures of chromatically responsive cholesteric liquid crystalline materials. These devices can be tailor made to accomplish the desired task by variation of characteristics imparted thereto by any one of the following adjustments; (a) electric field response range; (b) size of the liquid crystal droplets; (c) type and thickness of the polymer matrix material; (d) specific composition of the cholesteric liquid crystalline material(s), and the like, all to the purpose of choosing a response suitable for a given proposed use.

The present invention will be illustrated in greater detail in the following examples which are included herein for illustrative purposes and should not be interpreted as limiting the present invention.

All percents and parts are by weight unless noted otherwise.

EXAMPLES 1—4

Cholesteric members comprised of droplets of cholesteric liquid crystal material confined in substantially continuous solid polymer matrices are prepared using the below tabulated variety of specific matrix and liquid crystal materials. In each case 60 grams of cholesteric liquid crystal material is disposed in 100 cubic centimeters of the aqueous polymer solution in a Waring blender heated to 70° centigrade by a heating jacket. Upon dispersion and formation of the desired emulsion droplet size (in the range of 1 to 50 microns), the various solutions, respectively, were coated onto glass which was coated previously with the oxide (in conventional manner). The tin oxide coating is of a thickness corresponding to a resistivity of approximately 100 ohms per square. After drying, a commercially available black lacquer is sprayed over the exposed surface of the liquid crystal-containing polymer matrix, and dried. The black lacquer is "Spray On No. 6223008," which contains carbon black in an insulating binder matrix. Silver conductive paint is then applied to form an electrode on the black paint, and wires are attached to the silver electrode and the tin oxide coating and connected to an alternating current source of electric potential (although either alternating current or direct current can be utilized). The resulting basic configuration is essentially the same as those shown in FIGS. 3 and 7.

Upon application of the alternating current potential, the reflectance from the area over the silver electrode when viewed with incident white light, shifts from green (first chromatic state) to blue (second chromatic state). After the electric field is removed, the reflectance does not return to the original green color, but instead assumes a grey appearance (third chromatic state), which is in very good chromatic and configurational contrast to the green background areas which are not subjected to the field.

On the reapplication of the electric field, that area of the encapsulated cholesteric liquid crystalline member through which the field passes instantaneously turns to the blue color (second chromatic state). Repeated, extensive cycling of the current on and off clearly demonstrates and the cholesteric liquid crystal member possesses the ability to be cycled for extended periods without breakdown or loss of clearly discernible color contrast between the first, second and third chromatic states.

The pertinent compositional makeup of the liquid crystal materials and matrix polymers used are tabulated below.

| Ex. | Matrix polymer | Polymer concentration in aqueous solution, wt. percent | Cholesteric liquid crystal mixtures | |
|---|---|---|---|---|
| | | | Component | Wt. percent |
| 1 | Polyvinyl alcohol ("Elvanol 7124").* | 10 | Cholesteryl nonanoate. | 70 |
| | | | Cholesteryl chloride. | 25 |
| | | | Cholesteryl cinnamate. | 5 |
| 2 | Polyvinyl alcohol ("Elvanol 5105").* | 25 | Cholesteryl nonanoate. | 38 |
| | | | Oleyl cholesteryl carbonate. | 38 |
| | | | Cholesteryl chloride. | 24 |
| 3 | Polyvinyl alcohol ("Elvanol 7005").* | 12.5 | Same as ex. 2 | |
| 4 | Gelatin ("Gelatin AE-4").** | 10 | do | |

*

The "Elvanol" polymers are polyvinyl alcohols marketed by E. I. du Pont de Nemours & Company, Inc., Wilmington, Del. The differing numbers following the designation Elvanol indicate specific products having varying viscosities. "Elvanol 7124" is characterized by the fact that (a) a 4 percent, by weight, aqueous solution has a viscosity of 23 to 28 centipoises at 25° centigrade, and (b) the material is 97.7 to 98.8 percent hydrolyzed, i.e., that percentage of acetate or other chemical groups originally present in molecules of the material have been converted to hydroxyl groups. "Elvanol 5105" has a viscosity at 25° centigrade (4 weight percent aqueous solution) to 4 to 6 centipoises and is 88 to 89 percent hydrolyzed; and a four weight percent aqueous solution of "Elvanol 7005" has a viscosity at 25° centigrade of 4 to 6 centipoises and is 99 to 100 per cent hydrolyzed.

**

"Gelatin AE-4" is an acid extracted pigskin gelatin having a bloom strength of about 285 to about 305 grams and an isoelectric point of pH 8 to 9.

With further samples of the same articles produced as indicated herein, the information present in the display device (viz, the colored area(s) on a different colored background produced by the electric potential) can be erased by application of heat to attain the isotropic melting point of the liquid crystal mixture in question, thus generating the entire film to its original green color first chromatic state) when cooled again to room temperature. Another way of regenerating the film is to regenerate it selectively by application of the heat or an electric current of sufficient intensity to raise the temperature to the isotropic melting point of the liquid crystal mixture in selected areas only. In such a case, electrical current is passed through those resistive elements whose chromatic representation or image is to be erased, causing the elements to be heated to the isotropic transition temperature. Hence, the erasure of the chromatic image can be general (to regenerate the entire film) or selective to a particular area thereof. The electroconductive force or potential levels required to secure the second chromatic state and erasure of the third chromatic state will depend mainly upon the thickness of the cholesteric liquid crystalline member and the spacing of the conducting electrodes. For example, erasure can be achieved readily for 10 to 100 micron thick cholesteric liquid crystalline members by applying a potential of 100 to 500 volts across the conductive elements to heat the elements to the isotropic melting point of a given liquid crystal mixture.

A variant of the article of Example 2 is prepared by applying the liquid crystal droplet-polymer matrix emulsion coating on "Mylar" film, painting the uncoated side of the "Mylar" film black with "Spray On No. 6223008" and pressing the liquid crystal droplet-polymer matrix side of the film to the oxide-coated glass. The polyester ("Mylar") film serves as an additional protective (barrier) film to protect the liquid crystal droplets, viz, additional to the polymer matrix. Of course, other equivalent protective polymeric materials can likewise be used. The use of such a protective film is preferable as it reduces the difficulty sometimes encountered in painting the silver or other electroconductive material directly on the liquid crystal droplet-containing polymer matrix film. While the cause of this difficulty is not entirely understood, it is believed due to some unconfined surface inclusions of liquid crystal material in the matrix film which allow a solvent component(s) in the silver paint to dissolve in the unprotected liquid crystals in the area(s) where such unconfined inclusions are present.

EXAMPLE 5

The procedure of Example 1 is repeated except using a Mylar protective film and a mixture of cholesteric liquid crystalline materials containing 73 weight percent cholesteryl nonanoate and 27 weight percent cholesteryl chloride. Upon application of the electric field a color change of from red (first chromatic state) to dull grey or black (second chromatic state) was observed. It should be noted here that the comparatively small amount of heat generated due to application of the electric field is insufficient to cause the liquid crystal to become liquid. Upon turning off the current, the color instantaneously changes from dull grey-black to a dull red (third chromatic state). This third chromatic state is sufficiently sharp in contrast to that of the first chromatic state to enable clear distinction thereof to the naked eye.

EXAMPLE 6

The procedure of Example 1 is repeated except using a protective "Mylar" film and a cholesteric liquid crystalline mixture containing 79 weight percent of cholesteryl nonanoate, 14 percent of cholesteryl chloride and 7 weight percent of oleyl cholesteryl carbonate. The matrix film thickness is 80 microns. Upon application of an electric potential of 100,000 volts per centimeter thickness of the cholesteric liquid crystalline member, the observed color of the cholesteric liquid crystalline mixture changes from green (first chromatic state) to blue (second chromatic state). Upon removal of the electric field by shutting off the current, the third chromatic state is instantaneously experienced, which is a grey-green color of sufficiently sharp contrast to that of the first chromatic state to be readily observable to the naked eye.

EXAMPLE 7

Twenty-five copper plates 1 cm. × 2 cm. × 0.25 cm. are bonded to a plastic substrate in an evenly spaced 5 row-5 column matrix. Each of the plates is soldered to a conductive lead wire extending through the substrate. The copper plates are sprayed with an insulating black lacquer and a film of matrix confined-liquid crystal droplets prepared noted, with Example 6 is coated on the lacquer to a thickness of about 100 microns.

The assembly is mounted in a vacuum chamber which is equipped with a transparent plastic port (window) such that the liquid crystal-containing film is readily visible through the port. The conductive lead wires are connected to vacuum tight electrical feedthroughs in a plate at the opposite end of the vacuum chamber from the transparent port. A tungsten wire is mounted about two inches in front of the matrix (as noted, e.g., in FIG. 4) and connected to a direct current power supply.

The chamber is pumped down to $1 \times 10^{-6}$ Torr vacuum and a current of about 3.5 amps are passed through the tungsten wire causing it to glow red. When selected plates in the assembly are charged to a positive potential of 700—1500 volts, the electrons emitting from the hot wire are attracted to the surface of the liquid crystal-containing polymer matrix film adjacent to the charged plates, and the electric field established between the surface electrons and the plate causes the liquid crystals to change shade of color from green to dark grey-green. When the field is removed by removing the potential from the plate, the chromatic image persists but in a readily discernible different shade, viz, lighter grey-green.

EXAMPLE 8

A liquid crystal display utilizing a conventional cathode ray tube (C.R.T.) output is prepared in the following manner. The target face of the tube is coated on the interior surface with a transparent electrode. A polymer matrix-bound film of field responsive cholesteric liquid crystal droplets (as in Example 6) is coated in contact with the transparent electrode as shown in FIG. 5 followed by application of a protective "Mylar" film. A black insulating lacquer film is sprayed on the Mylar film. As mentioned previously, this black film is used to absorb light transmitted through the liquid crystal film in order to enhance the contrast of color or shade of color scattered from the liquid crystals.

Inasmuch as the liquid crystal is not in contact with another reflective surface on its interior surface (when used in a C.R.T.), this black insulator film is probably optional with this device.

After coating of the black film, the tube is pumped down to suitable vacuum and can be operated as a conventional video tube. The transparent electrode on the face plate is held as a positive potential and the electron beam is caused to trace the desired pattern on the liquid crystal-containing film.

The local fields set up between the electrons trapped at the interior surface of the liquid crystal (or black insulator) and the positively charged transparent electrode cause the liquid crystals to change color in those areas and form a visible pattern which may be observed through the face plate and the transparent electrode. The pattern is optionally comparatively permanent, viz, subject to erasure, and one sweep of the electron beam will suffice to establish the image. This image can be erased generally or selectively (in certain areas thereof) by heating the liquid crystal to its isotropic transition temperature. The color shade changes are the same as noted above in Example 7.

Since the mechanism requires only that the electrons be deposited on the liquid crystal surface, the electron beam can be of much lower energy than normally required for stimulation of a phosphor (most often used for C.R.T. imaging).

The liquid crystal image depends on reflected light and therefore is best observed under strong exterior illumination—a condition under which the standard phosphor coating is of marginal performance. Hence, strong color contrasts are achievable with the present invention in strong daylight versus very weak color contrasts with conventional phosphors at the same conditions.

EXAMPLE 9

This device is similar in many respects to that described under Example 8 except that the liquid crystal containing, polymer matrix bound film is applied to the exterior of the C.R.T.

The face plate of the C.R.T. is prepared with a matrix of closely spaced conductive wires imbedded in it with one end of the wires exposed to the interior of the tube and the other end flush to the exterior surface of the faceplate, as shown in FIG. 6. The exterior surface is painted with a black insulating film if desired, and then a film of cholesteric liquid crystal (as in Example 6) is coated on the black insulator followed by optional application of a protective "Mylar" film.

A transparent plate with a transparent electrode coated on its surface is attached to the tube with the conducting surface in contact with either the protective "Mylar" film (if used) or the liquid crystal film.

The transparent electrode is charged positively and the C.R.T. is operated in a conventional manner such that an electron beam strikes the wire ends extending through the faceplate in the pattern desired. The electrons are conducted through the individual wires of the faceplate to the surface of the cholesteric liquid crystal containing film which exhibits a color change in the areas between the wires which have been charged by the electron beam and the positively charged transparent electrode in the same manner as noted above in Example 7.

While the above Examples illustrate the invention in great detail, it should be understood that the present invention in its broadest aspects is not necessarily limited to the specific materials, conditions, and structural embodiments set forth therein.

What I claim is:

1. An article of manufacture comprising a pair of spaced electrodes and located there between a cholesteric liquid crystalline member chromatically responsive to the electric field imposed due to said electrodes and comprised of a plurality of individual minute, naked droplets of cholesteric liquid crystal material confined in a substantially continuous polymeric matrix.

2. An article as in claim 1 wherein said electric field ranges from about 10,000 to about 1,000,000 volts per centimeter of thickness of said cholesteric liquid crystalline member.

3. An article as in claim 1 wherein one of said electrodes is substantially transparent.

4. An article as in claim 3 wherein includes an opaque contrasting background located behind said cholesteric liquid crystalline member.

5. An article as in claim 4 which includes a substantially transparent protective covering for said substantially transparent electrode.

6. An article as in claim 4 which includes a protective polymer film located intermediate said opaque contrasting background and said cholesteric liquid crystalline member.

7. An article as in claim 6 wherein said droplets are uniformly distributed within said polymeric matrix.

8. An article as in claim 6 wherein said droplets have average diameters ranging from about 1 to about 30 microns.

9. An article as in claim 6 wherein said cholesteric liquid crystalline member contains from about 30 to about 95 weight percent cholesteric liquid crystal material, based on the total weight of said matrix and liquid crystal material.

10. An article as in claim 6 wherein the average thickness of said liquid crystalline member ranges from about 0.001 to about 0.05 centimeters.

11. A display device for chromatically representing a configuration established by an electric field comprising a first electrode and a second electrode spaced therefrom, said first electrode being closer to a viewing agency than said second electrode, and a cholesteric liquid crystalline member located between said electrodes and chromatically responsive to said electric field said member comprised of a profusion of individual, minute, naked droplets of cholesteric liquid crystal material confined in a substantially continuous, solid polymeric matrix.

12. A display device as in claim 11 wherein said first electrode is substantially transparent.

13. A display device as in claim 12 wherein said substantially transparent first electrode has a substantially transparent protective covering.

14. A display device as in claim 11 which includes an opaque contrasting background located between said cholesteric liquid crystalline member and said second electrode.

15. A display device as in claim 14 which includes a protective polymer layer located intermediate said opaque contrasting background said cholesteric liquid crystalline member.

16. A display device having polychromatic capability for chromatically representing an optionally comparatively permanent yet thermally erasable configuration established by an electric field in optional conjunction with an independently operable yet thermally erasable transient, thermally operable, separate display means, said device comprising a transparent support; support; a transparent electroconductive coating on said support; conductive electrodes in contact with said coating and operatively connected by leads to an electric field source; an insulator film having a cholesteric liquid crystal member in intimate proximity to said film and said coating, said cholesteric liquid crystal member comprised of a profusion of individual naked droplets of cholesteric liquid crystal material, chromatically responsive to an electric field, confined in a substantially continuous solid polymeric matrix; and at least one electrically conductive resistive element in thermally responsive association with said cholesteric liquid crystal member, each said resistive element having a separate pair of conductive leads connected to a current source operable independently from said electric field source and wherein said cholesteric liquid crystal member is chromatically responsive to both an electric field and thermally energy applied thereto.

17. A display device as in claim 16 wherein said insulator film is opaque.